Jan. 16, 1962  B. G. ERICKSON ETAL  3,016,690
AUTOMATIC POWER PLANT SYSTEM
Filed Dec. 1, 1958  7 Sheets-Sheet 1

INVENTORS
BRUCE G. ERICKSON
ALBERT T. METCALF JR.
BY EDWIN C. SCHUSTER

Parker & Carter
ATTORNEYS.

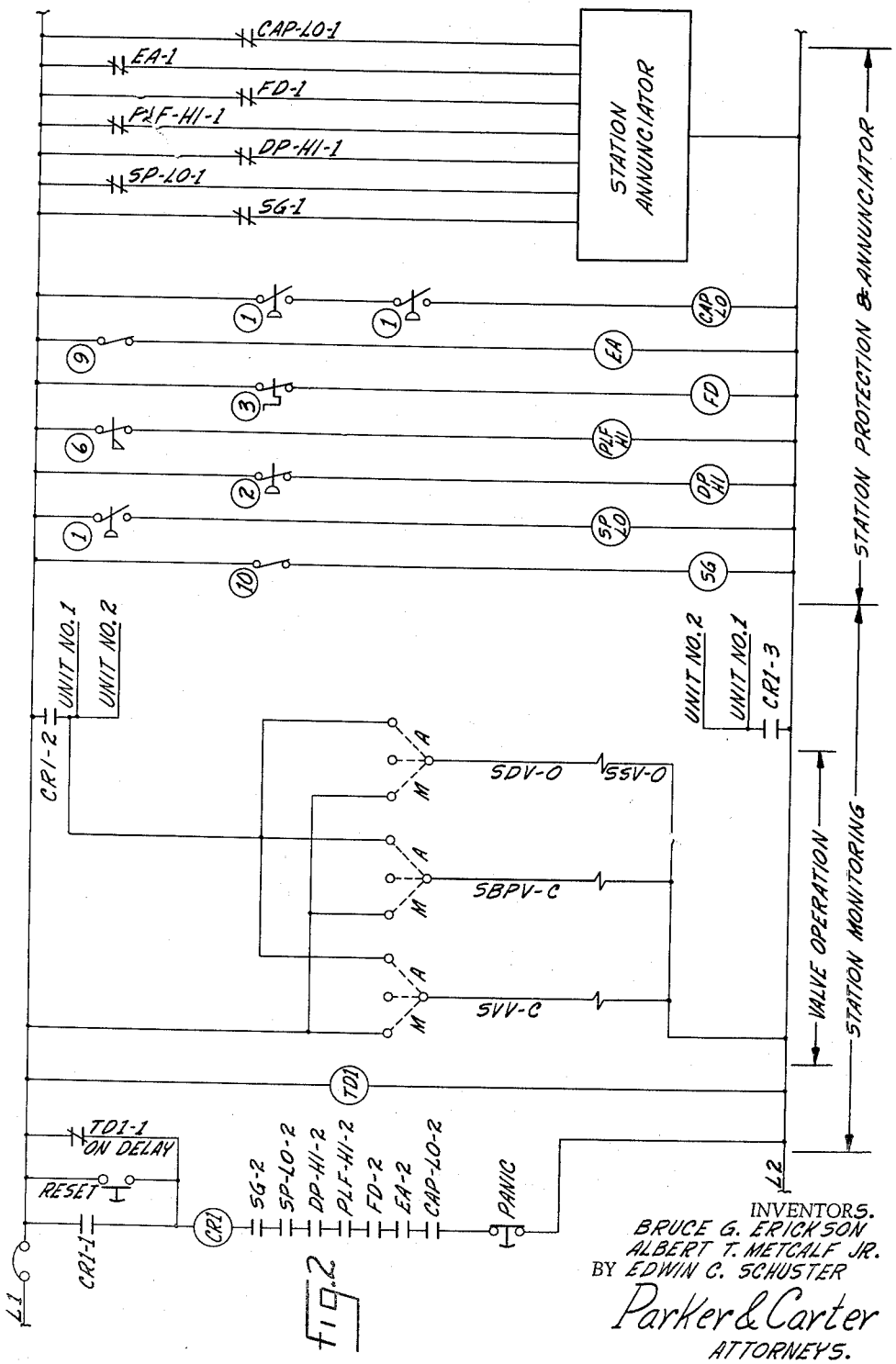

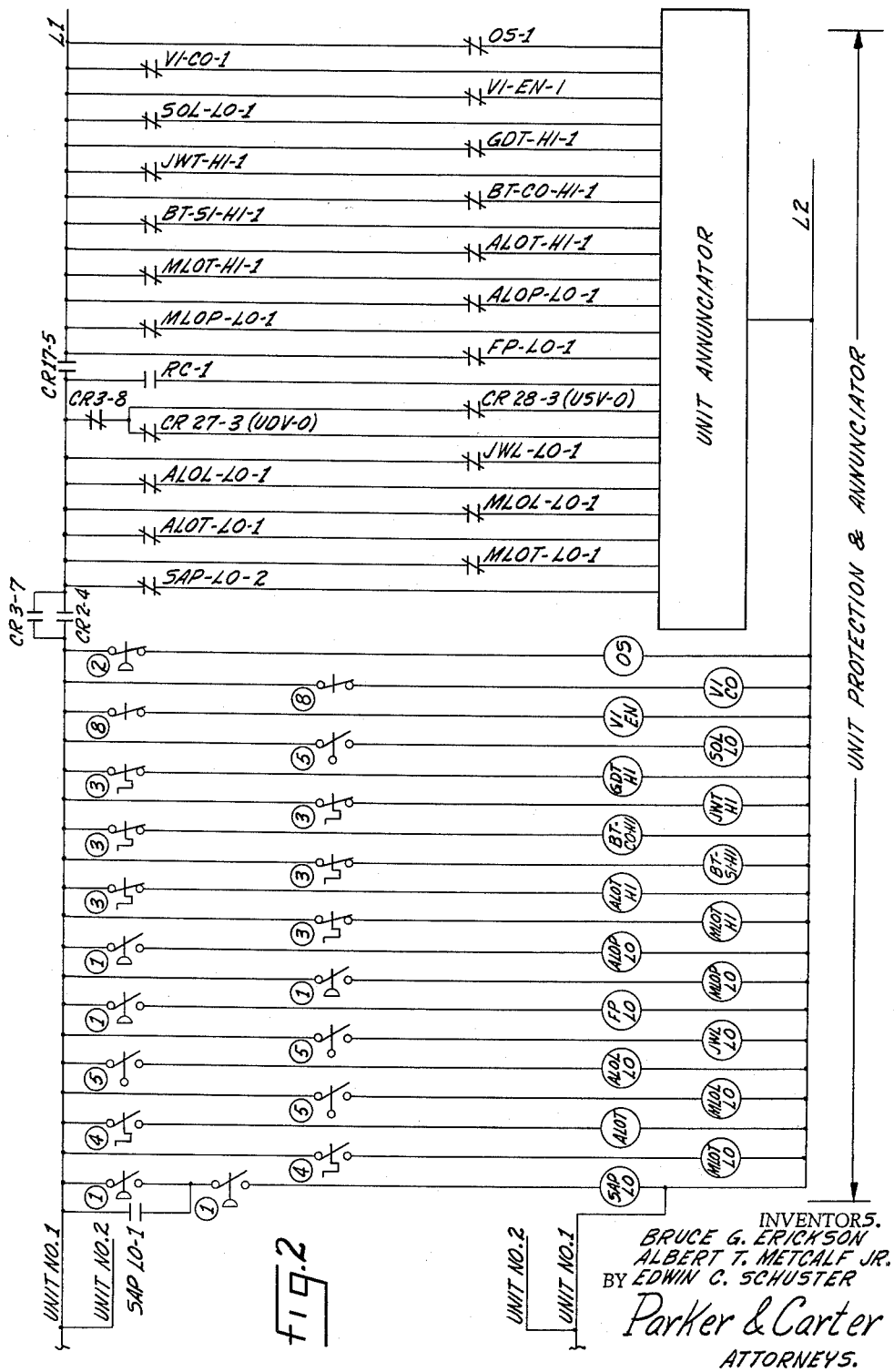

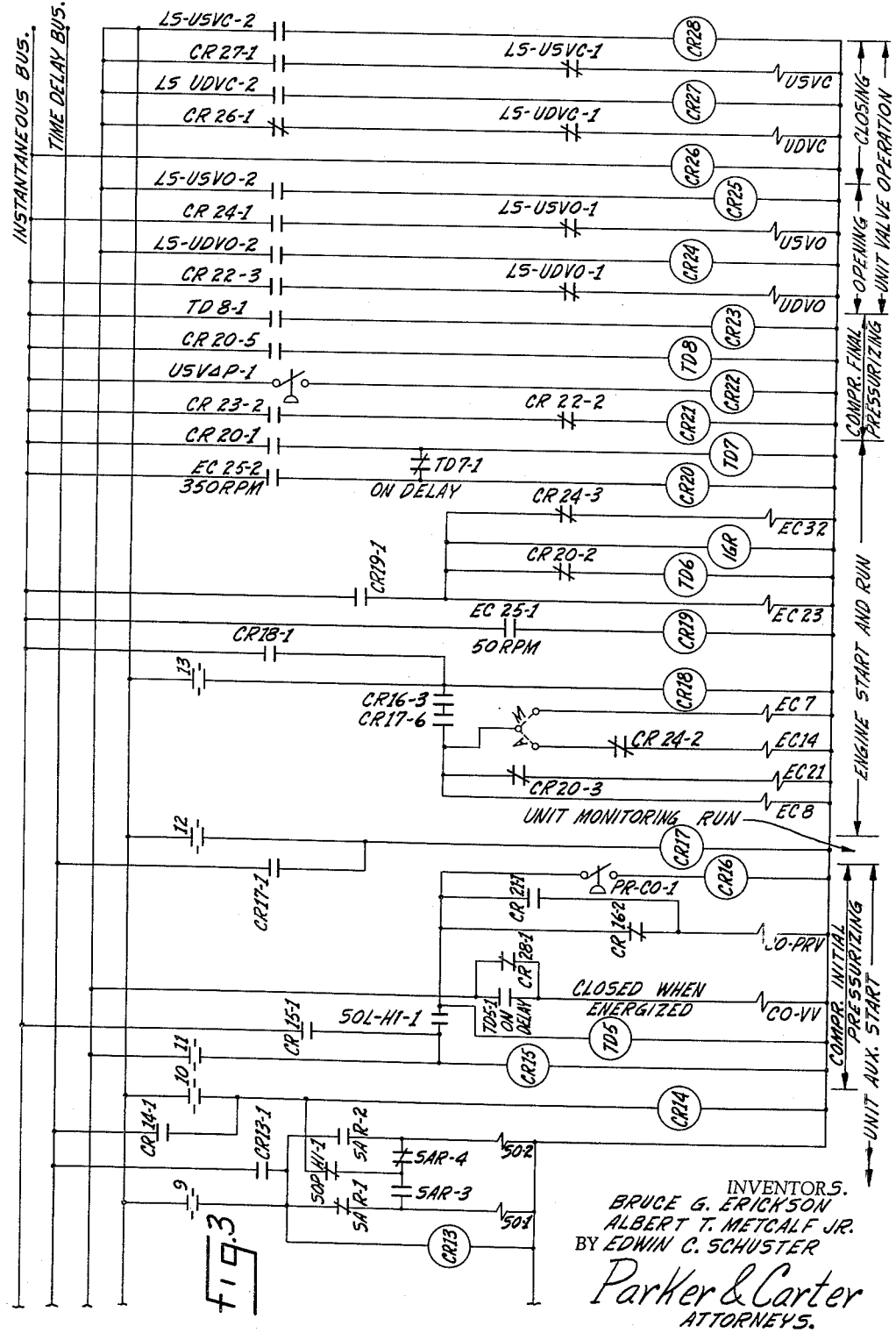

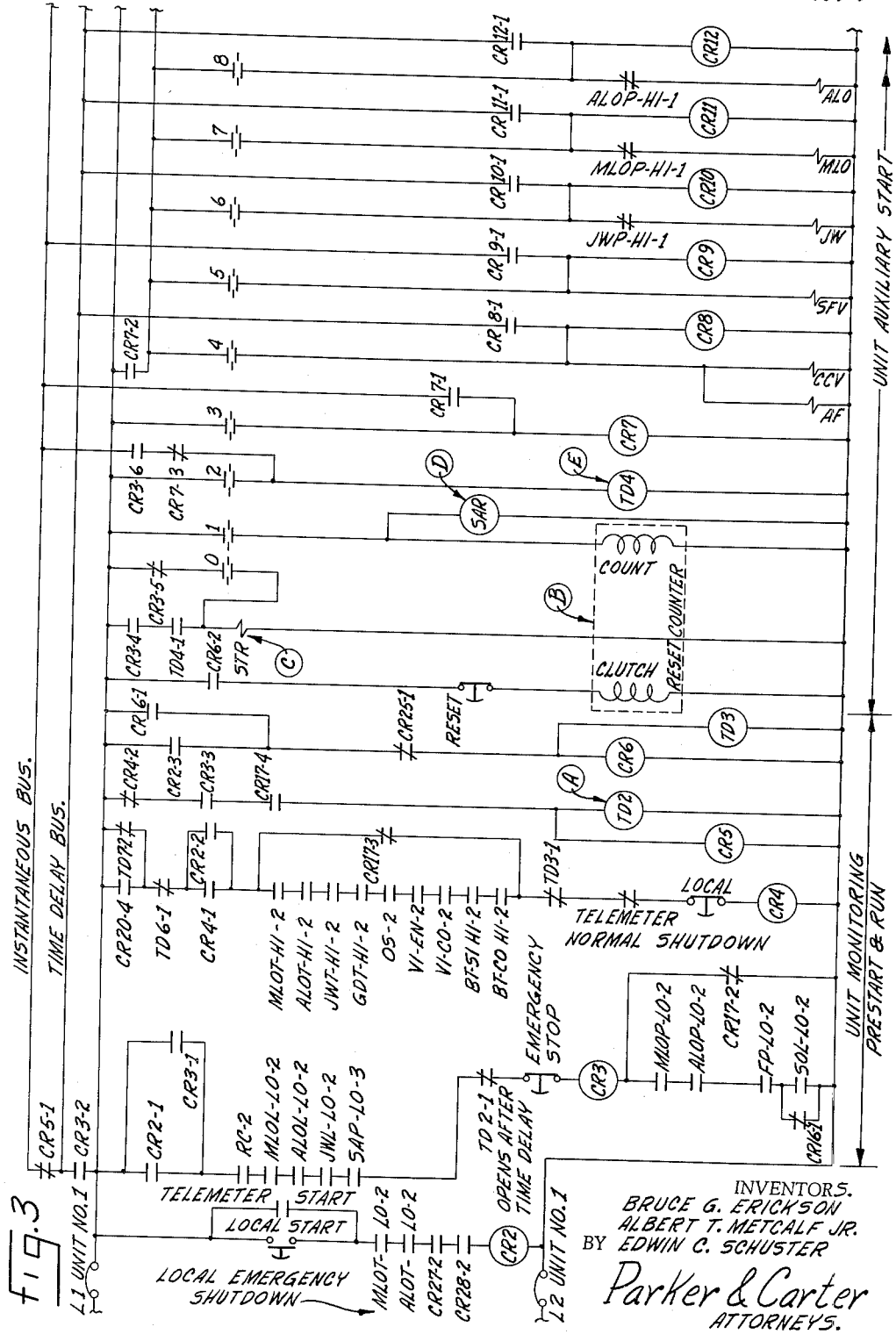

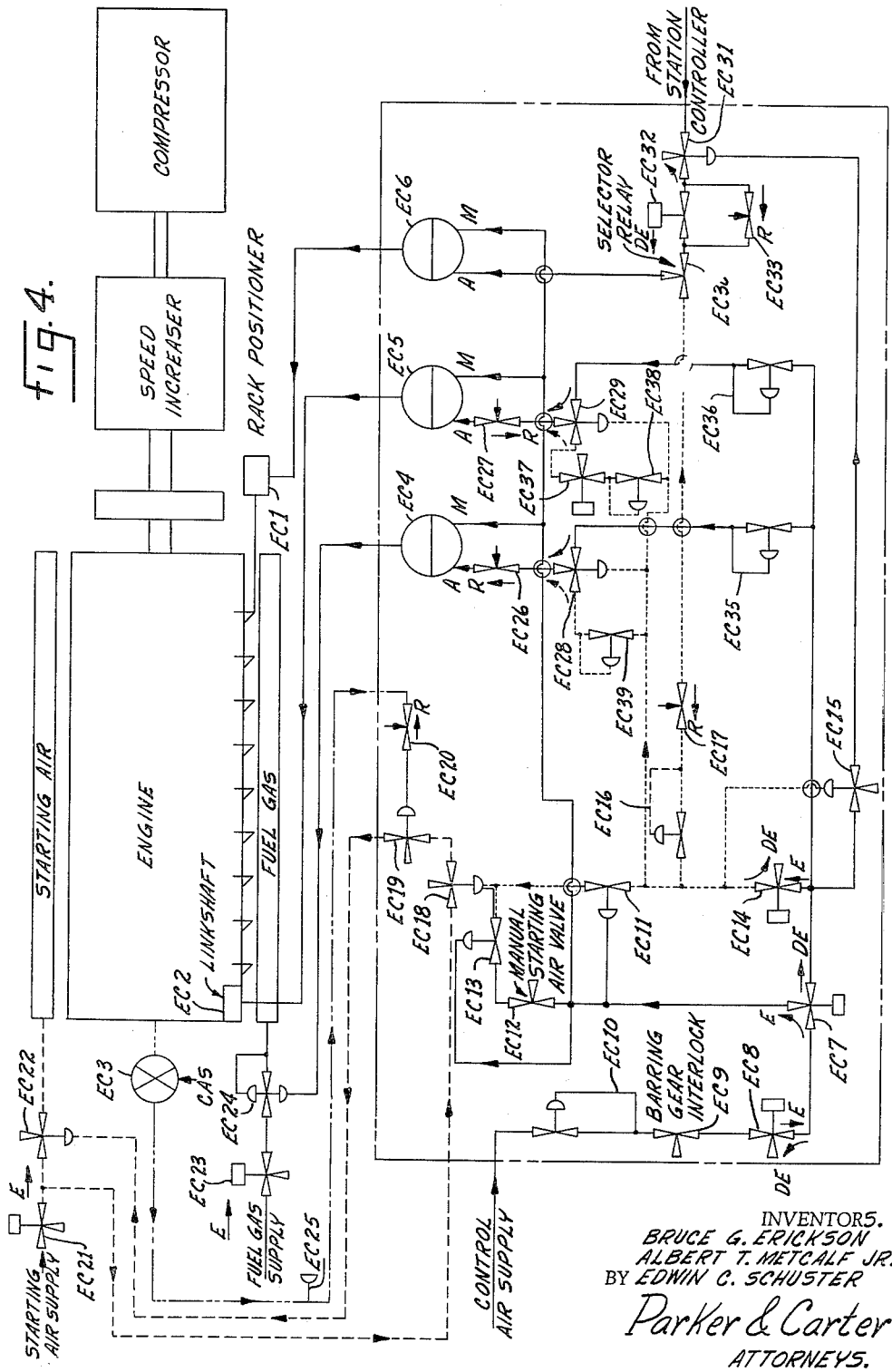

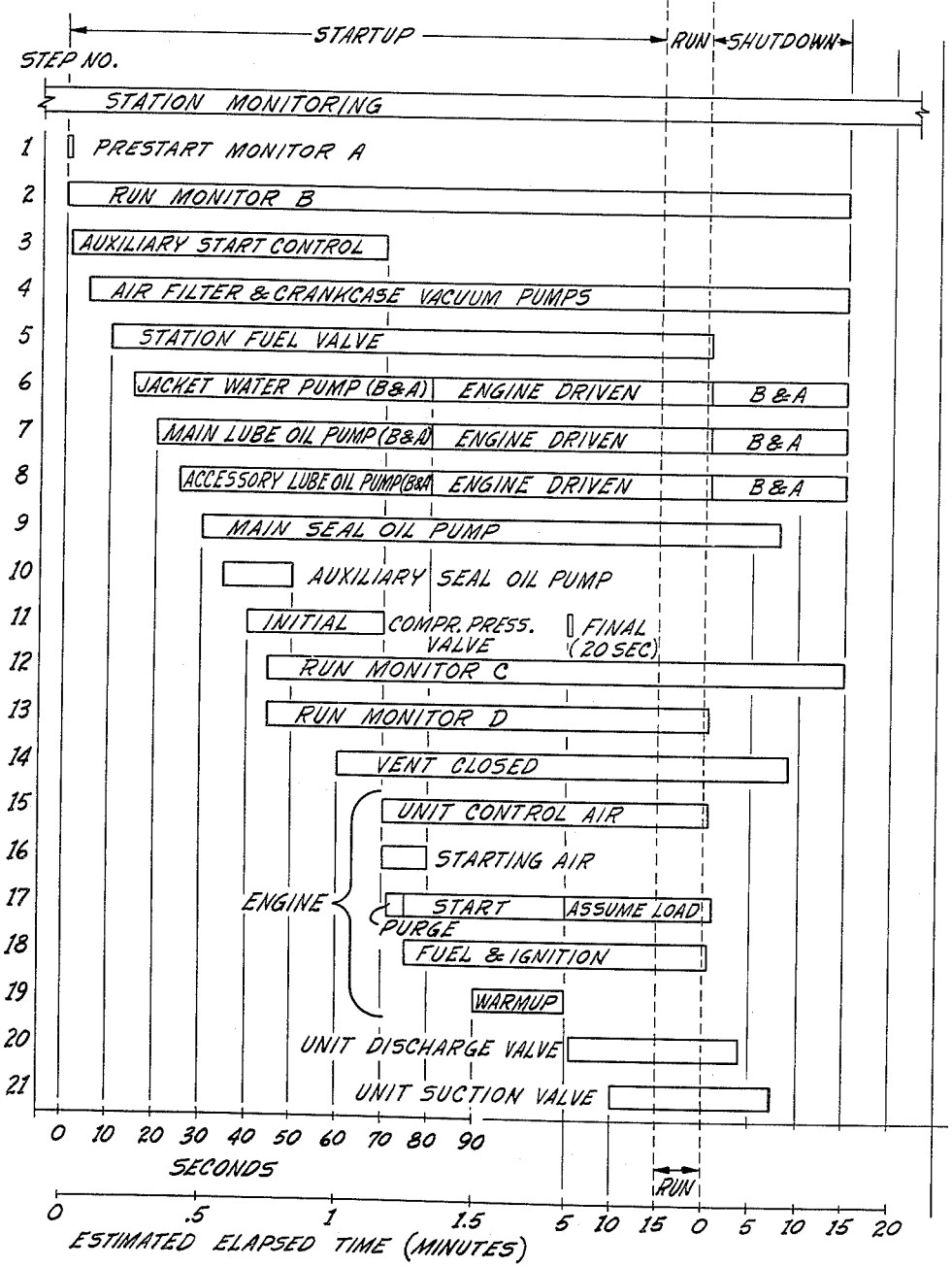

United States Patent Office 3,016,690
Patented Jan. 16, 1962

3,016,690
AUTOMATIC POWER PLANT SYSTEM
Bruce G. Erickson, South Milwaukee, Albert T. Metcalf, Jr., Greenfield, and Edwin C. Schuster, West Allis, Wis., assignors to Nordberg Manufacturing Company, Milwaukee, Wis., a corporation of Wisconsin
Filed Dec. 1, 1958, Ser. No. 777,450
51 Claims. (Cl. 60—16)

This invention lies in the field of automation and relates particularly to remote control starting and operation of prime mover units located at substantial distances from a master control station.

The rising cost of labor in recent years has given increasing impetus to the development of automatic systems for performing operations having a degree of repetitive action. The tremendous growth of the pipeline industry for example has resulted in greater use of automation than ever before to transport natural gas, petroleum, slurries and other products efficiently and economically over distances ranging from a few miles to several hundred miles. Although the type of prime mover capable of control by automatic systems is practically unlimited, spark fired gas engines, diesel and dual fuel engines operating centrifugal pumps and compressors are most widely used in pipeline applications. All of these units lend themselves readily to remote control operation.

Accordingly, a primary object of the invention is the provision of an automatic system for remotely controlling the operation of engines or other sources of motive power located long distances from a master control station.

Another object is the provision of a flexible automatic prime mover system which may be operated semi-automatically, under supervisory controls, or completely by remote control.

Another object is the provision of a station annunciator and protective system for a single or multi-unit engine station which will shut down the entire station should an abnormal condition occur, prevent remote restarting of the engines under certain conditions and activate protective equipment if an emergency condition such as an explosive atmosphere or fire is detected by sensing equipment.

A further object is the provision of a unit annunciator and protective system including means for monitoring permissive start conditions of an engine or other prime mover at the time that a start is attempted whereby, if all preselected prestart conditions are determined to be normal, a start may be made.

Another object is the provision of an annunciator and protective system for a prime mover unit including means for monitoring permissive start conditions of an engine or other prime mover at the time that a start is attempted which will shut down the starting cycle if conditions become abnormal during start up and will continue to monitor so that even though the prestart has been completed, a detected malfunction or dangerous condition will cause shut down no matter what stage of start up or run the unit is in.

A further object is the provision of a shut down and restart system for an automatic remote control prime mover starting and operating system whereby restarting of the prime mover after a shut down resulting from a power failure may be remotely controlled, but must be locally actuated if the shut down was due to an abnormal operating condition.

Yet another object is the provision of a remote control engine starting and operation system for a plurality of satellite engine stations which, in response to a dangerous condition at a satellite station, will shut down the station and lock out the system so that a restart can be made only after an operator has visited the station, corrected the problem, and reset the controls, but which will permit a remote restart of the station if the shut down was due only to a power failure.

Another object is the provision of an automatic power plant system having two types of shut down, an instantaneous and a time delay shut down.

Yet another object is the provision of means for permitting operation of one or more engine driven units from a single pipeline controller while adding or removing an engine driven unit from pipeline operation without affecting other operating units through a bumpless switchover feature.

Another object is the provision of an automatic power control system whereby auxiliaries may be started in any timed sequence to avoid an initial power surge.

A further object is the provision of an automatic power plant system utilizing standard parts and adapted for incorporation into existing power plants so as to involve a minimum of redesign.

Yet a further object is the provision of a unique system of equalizing wear on similar auxiliaries in an automatic or manually operated prime mover system so that alternate components may be brought into operation on alternate starts or runs.

Still another object is to provide a method for starting and running a remotely located engine unit.

Yet another object is to provide a method for smoothly switching an engine unit from automatic or manual control to control dictated by load requirements.

Other objects and advantages of the invention will become apparent from the following description taken in connection with the accompanying drawings wherein by way of illustration and example certain embodiments of the invention are set forth.

This invention is illustrated more or less diagrammatically in the following figures in which:

FIGURE 2 is a schematic drawing of a station control system adapted for operation with one or more individual units;

FIGURE 3 is a schematic control drawing of a single unit in a multi-unit station capable of being regulated by the station control shown in FIGURE 2;

FIGURE 4 is an engine control schematic for a spark ignited gas engine capable of incorporation into the station of FIGURE 2 as the unit of FIGURE 3;

FIGURE 5 is a sequence timing diagram for the automatic pipeline station system illustrated in the preceding figures.

Like reference symbols refer to like parts throughout the following specification.

This invention is capable of wide utilization but for convenience, it has been shown in connection with the operation of a spark ignited natural or producer gas engine incorporated into an automatic pipeline station. With appropriate modifications particularly in the engine control circuit, the invention may be applied equally well to diesel or dual fuel engines, but for purposes of illustration only a single unit station having a spark ignited gas engine will be described.

One or a plurality of engines may be grouped together into stations with the stations spaced in accordance with the pipeline power requirements. Each engine may be adapted to run a single or a multi-stage centrifugal or other type of conventional pump for pumping gas, slurries, crude oil or its products from one point to another. By the use of the invention it is possible to put petroleum or other material into a pipeline system at one end and regulate its flow until it reaches its destination by operating satellite stations along the line remotely from the starting point or any convenient point without the use of any personnel at the satellite stations.

Only minor modifications are necessary to use the system in other power controlling and regulating applications, and the disclosure should not be considered as limited to pipeline use. In fact, the particular application to which the invention is applied in completely independent of the basic invention itself.

GENERAL OPERATION

Figure 1:
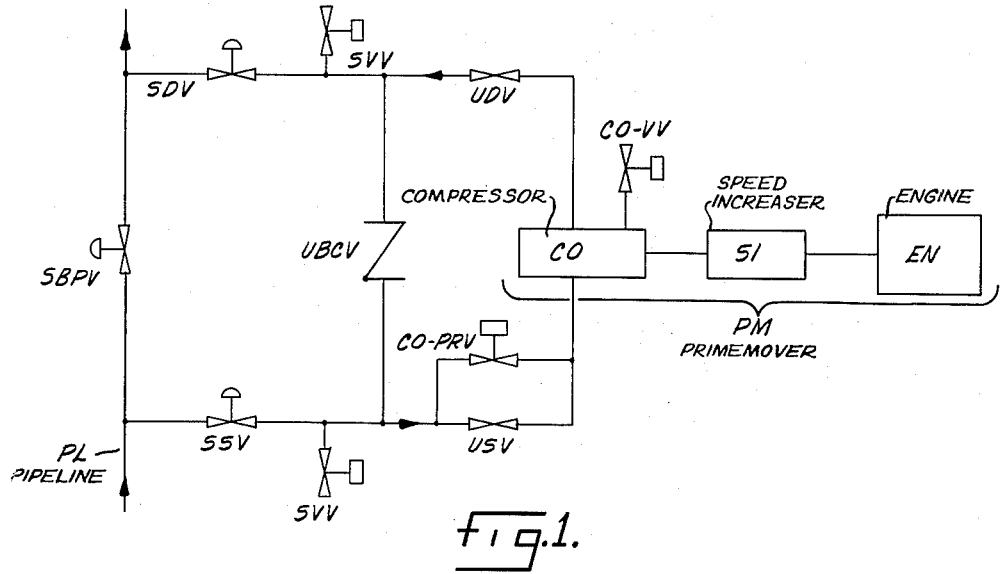
FIGURE 1 is a schematic station pipeline flow diagram.

Referring now particularly to FIGURE 1, a schematic station pipeline flow diagram for a single unit station (SUS) having an internal combustion engine is there illustrated. It will be understood that a plurality of engines or gas turbines or other sources of motive power could be connected in series or parallel to make up a multiple unit station (MUS) but for purposes of explanation the operation of a single unit station will illustrate the principles of the invention. In a multiple unit station there will be a duplication of the control circuits and an additional control circuit which may be actuated to bring in or cut out additional prime movers simultaneously or in sequence.

A pipeline adapted to carry petroleum, natural gas, slurries and other products is indicated generally at PL with the direction of flow indicated by the arrows. A satellite pumping station includes a prime mover unit consisting essentially of a spark ignited gas engine, EN, running a compressor, CO, acting as a pump. A speed increaser, SI, may be positioned between the compressor and the engine. The station may be located along the pipeline at any appropriate interval. In a natural gas pipeline for example, pumping stations may be located approximately 100 miles apart.

Each pumping station consists of a station loop piping circuit and a unit loop piping circuit. The station loop will be essentially the same in any installation but the unit loop will vary depending upon the number of prime mover units and their relationship to one another.

In this instance the station loop includes a pressure operated station suction valve, SSV, a pressure operated station discharge valve SDV, a pressure operated station bypass valve, SBPV, and a unit bypass check valve, UBCV. The suction, discharge and bypass valves are generally solenoid controlled but pressure operated. A pair of station vent valves SVV are included in the station loop for venting or purging the station loop piping preparatory to placing the station on the line. The unit bypass check valve UBCV permits the pipeline fluid to pass around the station loop when the unit loop is not placed in circuit with the station loop and the main bypass and station vent valves are closed, but prevents bypassing of the unit loop when the appropriate unit valves are open.

When the station is not in operation, the station suction and discharge valves will be closed and the station bypass valve opened to thereby completely bypass the station and unit loop piping.

The unit loop piping includes a unit suction valve USV between the station suction valve and the low pressure side of the compressor, and a unit discharge valve UDV between the station discharge valve and the higher pressure or outlet side of the compressor. A compressor pressuring valve CO–PRV is included in a line bypassing the unit suction valve and a compressor vent valve, CO–VV, opens into the compressor. These latter two valves are used during start up to purge the compressor of residual gases or explosive mixtures contained within it prior to putting the unit into the line. Pressures up to 1000 p.s.i. are attained during operation and the resulting heat generated may be sufficient to ignite natural gas contained within it.

The compressor, speed increaser (if used), and internal combustion engine are connected into the unit loop between the unit suction and discharge valves.

Figure 6:
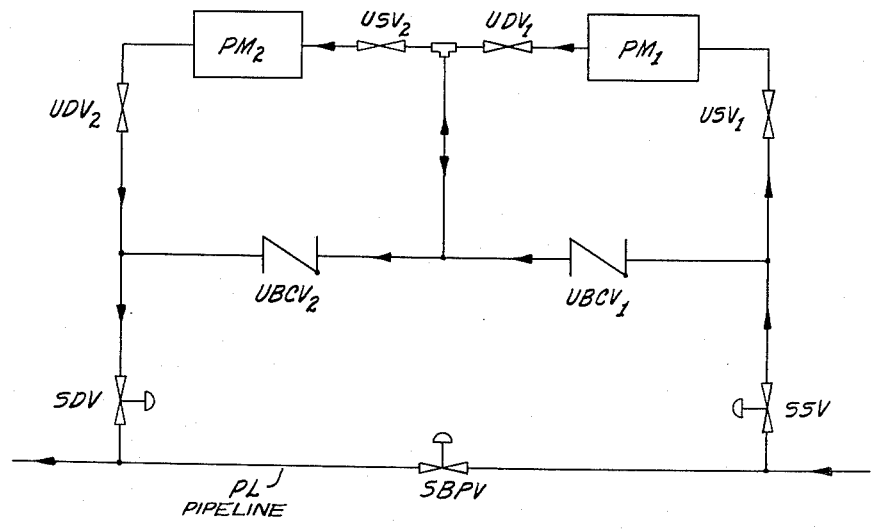
FIGURE 6 is a schematic illustration of a multi-unit station with the units connected in series.

Referring now to FIGURE 6, a multiple unit station, MUS, is there shown as including a station loop having a station bypass valve SBPV and station discharge and suction valves SDV and SSV, a pair of unit bypass check valves, $UBCV_1$, $UBCV_2$, and a unit loop.

The unit loop piping includes unit suction and discharge valves $USV_1$, $USV_2$, and $UDV_1$, $UDV_2$. A pair of prime mover units including compressors are indicated generally at PM1 and PM2.

Either or both of the prime mover units may be put on the line by proper valve regulation. When either is placed on line, the station bypass valve will be closed and the station discharge and suction valves will be opened as in FIGURE 1.

To place both PM1 and PM2 in the line, unit suction and unit discharge valves will be open, and the unit bypass check valves operate to prevent any flow of fluid around the units.

To place only PM1 in the line, the unit suction valve, $USV_1$, unit discharge valve, $UDV_1$, and unit bypass check valve $UBCV_2$ are opened and the unit suction valve $USV_2$ and unit discharge valve $UDV_2$ are closed. Similar valve manipulation will place only PM2 in the line.

The piping shown is a straight through system in which the fluid discharged from PM1 flows only a short distance through a T directly into PM2. It will be understood that it may often be advantageous to utilize a loop system whereby fluid discharged from a first prime mover unit is passed through a plurality of loops before entering a second prime mover unit. This system reduces the strain on the bearing connections between adjacent lengths of pipe due to temperature differentials which tend to expand the piping unevenly.

Although a series hookup with straight through piping has been shown it will be understood that it is entirely feasible to utilize the invention in a station having either straight or loop piping with the individual units connected either in series or parallel. The particular arrangement will depend upon the design of the particular pipeline and since they do not form an essential part of the invention per se they are not further illustrated.

The foregoing preliminary description and the following detailed description are directed to an application of the invention in the pipe line industry. The invention is capable of application to many other fields, however. In its broadest aspects, it is applicable to any situation in which unattended operation of a source of motive power is required. The particular source of motive power may be an internal combustion engine such as a spark ignited gas engine, a diesel engine, or a gasoline engine. Gas turbines or even electric motors could be utilized. Exemplary applications would be in the field of off-shore drilling and electrical power generation, on either a primary or standby basis. In addition the invention could be utilized in pumping operations other than pipe line application, such as pumping sewage, or water out of mines or through municipal water supply systems. The invention could even be used to control engines from the bridge in seagoing vessels.

SYSTEM OPERATION

The operation of an automatic gas pipeline station requires the following systems to make it self-sustaining. In a manned station these functions are normally accomplished all or in part by operating personnel.
 (1) Station annunciator system.
 (2) Unit annunicator system.
 (3) Station control system.
 (4) Unit control system.
 (5) Station and unit shut down system.

The station and unit annunciator systems are shown principally in FIGURE 2 and the station and unit control and shut down systems are shown principally in FIGURE 3. An engine control schematic for a spark ignited gas engine capable of incorporation into the station of FIGURE 2 as the unit of FIGURE 3 is illustrated in FIGURE 4 and its operation is tied into the control system of FIGURE 3 in the portion of the figure entitled "Engine Start and Run." The operation of the systems illustrated in FIGURES 2, 3 and 4 are closely tied together but for purposes of explanation they will be discussed separately as far as possible.

It will further be understood that the type and amount of auxiliaries utilized will vary from system to system and the particular auxiliaries described and illustrated are intended to be exemplary only.

In all figures in which the prefix CR or TD appears in a circle followed by a number, the solenoid coil of a conventional electrical relay switch is indicated. The contacts associated with a CR (control relay) switch open or close upon energization of the coil, whereas those controls associated with a TD (time delay) switch open or close at the expiration of a time lag after energization of the coil. For contacts indicated as "On Delay" the time cycle starts upon energization of the basic time delay relay. For contacts indicated as "Off Delay" the time delay cycle begins upon de-energization of the basic time delay relay. Each switch may have one or more contacts, each contact bearing the same letter and number as the basic control switch followed by a hyphen and a second identifying numeral. Whether the contacts are normally opened or normally closed is indicated in the following legend under the heading "Station and Unit Control Symbols," and these terms refer to the position of the switch before it is placed in the circuit. All switches and relay contacts are shown in a de-energized state. The control power required to actuate the system in this instance is 110 volt A.C. 60 cycle. It will be understood that any convenient type of power such as 220 volt 50 cycle power may be utilized. The power may be either A.C. or D.C. or even derived from batteries. In essence, any control power that will actuate the component relays is feasible, and a hydraulic liquid or pneumatic fluid system may be substituted for the illustrated electrical system. The switches indicated by a plurality of letters other than CR or TD (as explained in the "Station and Unit Control Symbols" legend) are associated with protective devices. These protective devices are responsive to pressure, temperature, fluid level, fluid flow or vibration changes when some predetermined value is reached.

*Station protection and annunciator system*

The station protection and annunicator system illustrated in FIGURE 2 consists of monitoring devices electrically connected to a locally installed annunciator, that is, at the satellite station, with additional contacts provided in the permissive start and station shut down circuits. The annunicator may be duplicated at a master station. Any preselected number of permissive start conditions can be provided. In FIGURE 2 seven protected functions have been selected which are as follows:

(1) Low station suction pressure (SP-LO).
(2) High station discharge pressure (DP-HI).
(3) High pipeline flow (PLF-HI).
(4) Fire (FD).
(5) Presence of explosive atmosphere (EA).
(6) Low station control air pressure (CAP-LO).
(7) Excessive surge (SG).

The above protected functions are monitored by protective switches, which when they detect an abnormal condition, shut the station down immediately through their component relays. Operation of any of these devices will indicate on the annunciator the cause of shut down, prevent restarting of the unit and activate protective equipment in case of an emergency.

For example, SG is a protective device which guards against excessive surge in the pipeline and includes a switch which opens on excessive surge. Assume that the coil SG of the surge switch is energized and pipeline flow is normal. Contact SG-1 will be open and contact SG-2 will be closed. (In like manner, the other six contacts in the CR1 circuit will be closed to energize CR1.)

The remaining six switches in the coil circuits will also be closed during normal operation, and the operation of the −1 and −2 contacts in response to an abnormal condition sensed by the protective device will be similar to SG-1 and SG-2. Should an excessive surge occur, the switch which opens on excessive surge in the SG circuit will open and de-energize SG. This will also close contact SG-1 which will actuate a red flag or other warning device on the station annunciator board to indicate that a dangerous condition has occurred and what that particular dangerous condition is. Simultaneously SG-2 will open, thus breaking the CR1 circuit across L1 and L2 and shutting down the entire station and preventing current flow into the units by opening contacts CR1-2 and CR1-3.

Two pressure switches are provided in the CAP-LO protective circuit to monitor the control air pressure at two separate points. One is located in the control air supply to the station controller and the second is located in the control air supply to the pneumatic part of the engine control system. This double measurement is necessary because each switch measures a supply of different pressure and each has its own pressure regulating system.

When 110 volt A.C. 60 cycle control power is put into the system through L1 and L2, and assuming that the seven protected conditions at the station are normal, a circuit will be made across L1 and L2 through TD1-1, the seven protected condition contacts and the panic button. Another circuit will be completed through timer TD1 which begins to time out. Energization of CR1 will close contact CR1-1 which will seal in the CR1 circuit after TD1 times out and TD1-1 opens. CR1-2 and CR1-3 will also close to furnish power to the units. It will be noted that power can only be furnished to each individual unit if the permissive station start conditions are normal. If any one is abnormal at startup there is no possibility of operation of the units, and, should an abnormal condition occur subsequent to startup, power to the units will be immediately interrupted.

Completion of the CR1 circuit also makes power available to the pilot solenoid valves for the station vent valve, station bypass valve and station suction and discharge valves, all as indicated in FIGURE 1. Whether current actually flows through the solenoid coils will be dependent upon the position of the manual-automatic three way switch. In the manual position, power will be instantly available to the solenoid coils and the valves will begin to open or close immediately. In the automatic position, current cannot flow through the solenoid coils unless the permissive start conditions are normal since the automatic connection is made to the unit control bus behind the CR1-2 contact.

There will be a considerable time lag before these large station valves are fully opened or closed, but when the vent and bypass valves are finally closed and the suction and discharge valves finally opened, pipeline flow will pass through the station loop piping including the unit bypass check valve.

*Unit protection and annunciator system*

To the right of the station protection and annunciator portion of the system is the Unit Protection and Annunciator portion of the system. Again it should be understood that the protected functions may be selected at will and will vary from installation to installation. In this instance there are nineteen protected functions which will shut a unit down upon malfunction whether on fully automatic or fully manual operation and at the same time indicate the particular malfunction.

Shut down of one unit will not affect the station protection portion of the diagram assuming the protected conditions at the station remain normal. If there are a plurality of units in operation, pipeline flow will merely bypass the inoperative unit. If there is only one unit in operation pipeline flow will pass through only the station loop piping.

The basic hookup of the Unit Protection and annunciator system is similar to that of the station protection and annunciator system and will not be further described in detail since the relay symbols indicate the function and operation of each switch, with the following exceptions.

As in the CAP–LO circuit, two pressure switches in the SAP–LO protective circuit are used to monitor the starting air supply pressure at two separate values. As the starting air supply pressure decays, the upper pressure switch opens, but the circuit will remain completed through SAP–LO–1 which seals in the coil as long as the pressure remains at a pre-determined value as monitored by the second pressure switch between L2 and SAP–LO–1.

Contacts CR27–3 and CR28–3 are located in the unit discharge valve—open circuit and unit suction valve—open circuit. Both valves must be closed before the unit can be started. If a start is attempted while either valve is open, the engine will not start. By placing these contacts in the unit annunciator, the reason for the engine start failure can be readily noted, and the valve condition corrected before another start is attempted. These contacts are tied in with limit switches on these valves which will become apparent upon a description of FIGURE 3. CR27–3 functionally might be termed "no start—unit discharge valve open" and CR28–3 "no start—unit suction valve open." These two annunciator indicators will be operative when a start is initiated either remotely or locally. Once the starting sequence has begun, they will be held off by the opening of contact CR3–8 since the valves will later open as part of the sequential control operation.

CR2–4 or CR3–7 must close before power is fed to the entire unit annunciator, and CR17–5 must be closed before power will be fed to the rest of the annunciator functions beyond it. These contacts will close upon energization of the CR2, CR4, and CR17 coils shown in FIGURE 3.

Referring now to FIGURE 3, the operation of an individual unit is there schematically illustrated. The first portion of the diagram includes the Unit Monitoring Prestart and Run circuits, which monitor startup and run conditions of the engine including a plurality of permissive start conditions; the second part of the diagram, the unit auxiliary start, includes the control circuits regulating startup of the unit auxiliaries including an initial compressor pressurizing; the third portion of the diagram, the engine start and run, indicates the engine start and run circuits; the fourth portion includes the compressor final pressurizing circuits, and the final portion indicates the opening and closing circuits for the unit valve operation.

Referring now to the unit monitoring prestart and run portion of the diagram, the power input lines are indicated at L1 and L2. A circuit breaker in each line is shown at the extreme left of the diagram. If the engine lubricating oil temperature (MLOT) and the auxiliary lubricating oil temperature (ALOT) are at a satisfactory value and contacts CR27–2 and CR28–2 are closed, the circuit will be completed across L1 and L2 through CR2 upon closure of either the local start contact or the telemeter start contact.

Energization of CR2 closes CR2–4 (FIGURE 2) and CR2–1 in the CR3 circuit and, if all the starting conditions to the left of CR17–5 are normal as indicated on the unit annunciator, CR3 will be energized which will close CR3–7 (FIGURE 2). CR2–4 then drops out and the unit annunciator is sealed in through CR3–7. CR2 and CR3 are progressive steps starting with the depression of the local start button or closing of telemeter contact.

If any one of the conditions up to CR17–5 are abnormal, the unit annunciator will, through its normally closed actuating contacts, indicate the condition and prevent further operation since all of them have contacts in the unit monitoring, prestart and run portion of FIGURE 3, and specifically in the CR2 and CR3 circuits.

All units to the right of contact CR17–5 would indicate malfunction when start is initiated if CR17–5 were not present because they represent auxiliaries which have not started. Thus, the reporting of these quantities are held off by CR17–5 until just before the starting of the engine. They are tied in with CR17 which is in the twelfth sequential step in the STR system (Step Relay).

The reset counter, RC, and the engine lubricating oil level—LO, MLOL–LO, auxiliary lubricating oil level—LO, ALOL–LO, coolant level—LO, JWL–LO, and starting air pressure—LO, SAP–LO, switches all have contacts in the CR3 circuit. These contacts represent conditions which must be met before starting is initiated but in addition they must also be maintained during the entire operation.

Energization of coil CR2 has closed contacts CR2–1 and accordingly, a circuit is then completed through CR2–1, RC–2, MLOL–LO–2, ALOL–LO–2, JWL–LO–2, SAP–LO–3, normally closed TD2–1, the auxiliary circuit emergency shut down button, CR3, and normally closed contact CR17–2. CR3–1 is closed to bypass CR2–1 and seal in the CR3 circuit.

CR17–2 bypasses a shut down circuit including contacts MLOP–LO–2, ALOP–LO–2, FP–LO–2 and SOL–LO–2. Normally closed contact CR16–1 bypasses SOL–LO–2. This shut down circuit is bypassed until just before the engine is ready to start and then thees protected functions are put into the CR3 circuit by opening of contact CR17–2.

Coil CR4 has been energized at the same time through normally closed CR17–3, which bypasses a plurality of protected functions to the right of CR17–5, CR2–2, the normally closed contacts TD3–1, TD7–2, TD6–1 and the local or telemeter shut down contacts. Energization of coil CR4 closes CR4–1 and opens CR4–2 which holds off the auxiliary shut down circuit.

Energization of coil CR2 has also closed contact CR2–3 and the CR6 circuit is completed through CR2–3, normally closed CR25–1, CR6 and TD3 and sealed in by CR6–1. TD3 is a timer which can be set at will to run a few minutes longer than the time required for a normal startup. Thus it will shut the unit down if full operation is not achieved when it has timed out, through TD3–1 in the CR4 circuit.

At this point, the unit monitoring prestart and run portion of the cycle has been completed if everything has proceeded in a normal fashion. The minimum starting conditions for the engine have been determined to be normal and the step switch, STR, is now set for operation which will time out the unit auxiliary start portion of the cycle on a step by step basis. Contact CR3–2 has been closed by the energization of CR3 to energize the time delay shut down bus and the instantaneous shut down bus through normally closed contact CR5–1.

Energization of CR3 has closed contact CR3–6 which completes a circuit through timer TD4 via normally closed CR7–3, the instantaneous shut down bus, normally closed CR5–1 and CR3–2. The clutch of the reset counter has already been energized by the closure of CR6–2.

TD4 is an oscillating timer. Upon energization, it feeds timed pulses to the sequential time relay or step switch coil, STR, which advances the step switch one pulse at a time. The step switch is in circuit through contacts CR3–4 and TD4–1. In the event that a malfunction is detected by the CR3 circuit, CR3–4 opens, CR3–5 closes and the step switch is caused to complete its cycle and return to the home position without starting the auxiliaries. The step switch may complete its return to the home position in a rapid fashion which for purposes of description will be termed "rapid home."

Sequential operation

*Steps 1 and 2.*—Contacts 1 and 2 close simultaneously. Closure of contact 1 gives a pulse to the count coil of the reset counter RC. This is to count the number of unsuccessful starts. The reset counter is reset to zero by the opening of the unit suction valve signifying that full operation of the unit is achieved.

The sequential alternating relay (SAR) coil is simultaneously energized. This is to equalize wear on the two seal oil pumps which will be described later. Contact 1 opens in the next step whereas contact 2 closes and stays closed for the rest of the cycle. This is the only contact that remains closed during the entire stepping cycle. All others open on a succeeding step. CR3–6 and CR7–3 is a circuit for momentary starting no matter what position oscillating timer TD4 has previously stopped in. The continuing closure of contact 2 keeps the oscillating timer TD4 operating. There will be equal increments of time between each one of the steps except for 1 and 2 which begin simultaneously.

*Step 3.*—Energization of coil CR7 closes CR7–1 which seals CD7 into the instantaneous bus and makes power available for subsequent starting of the auxiliaries through CR7–2. Any malfunction occurring in the direct line contacts in the CR3 circuit during startup will de-energize CR7 which will open CR7–2 and prevent the auxiliaries from starting.

*Step 4.*—With CR7–2 closed, an impulse through the contact of step 4 energizes the starter coils AF and CCV for the air filter and the crankcase vacuum pumps. They are both in the same line because they are small pumps. Closure of contact 4 also energizes coil CR8 which in turn closes contact CR8–1 sealing in the circuit on the time delay shutdown bus.

*Step 5.*—Step 5 seals in the master fuel valve SFV through closure of contact CR9–1 upon energization of coil CR9. This is comparable to the motor starter for the main fuel oil supply pump in a dual fuel or straight diesel engine.

*Step 6.*—Step 6 controls the engine jacket water system. When contact 6 closes, it energizes CR10 which seals itself in through contact CR10–1 energizing the motor starter of the motor driven B & A (Before and After) pump through the normally closed jacket water pressure switch (JWP–HI–1). This pump circulates water through the system "before" starting the engine and "after" shut down. During engine running it is shut off by pressure switch JWP–HI–1 which senses output pressure of an engine driven pump which is also in the system. Should the engine jacket water pump fail during operation, the B & A pump will assume operation by sensing a drop in output through JWP–HI–1 without causing shut down of the engine.

Upon normal shut down, the pressure switch JWP–HI–1 senses the shut down of the engine driven pump and starts up the B & A pump to run for a predetermined time after shut down by TD2 in order to cool down the engine. This comprises a time delay shut down.

*Steps 7 and 8.*—Steps 7 and 8 function in the same manner as step 6, but apply to the main and accessory lube oil systems respectively.

*Steps 9 and 10.*—Steps 9 and 10 should be considered together, for they cooperate to equalize wear on the seal oil pumps. The two pumps provide a liquid seal at each end of the compressor shaft, or one end as determined by compressor design, to eliminate gas leakage from inside the unit compressor out into the station. The two pumps are needed initially to pump up the seal oil tank which is elevated above the engine compressor unit. The oil in this tank is also pressurized with gas from the compressor through a connection from the compressor to the top of the seal oil tank so that the seal oil pressure is always greater than the compressor gas pressure by the hydraulic head of the seal oil tank thus providing a positive seal. After the seal oil system is brought up to proper operating tank level and accompanying pressure, one pump shuts down and remains on standby duty in the event of failure of the other pump.

Assume that contacts are in the position shown, that is, contacts SAR–1, SAR–4, and SOP–HI–1 are closed and SAR–2 and SAR–3 open. Closure of contact 9 energizes coil CR13 which seals itself in through contact CR13–1 on the time delay shut down bus. The circuit is completed across the lines through SAR–1 to the seal oil pump motor starter (SO–1) coil. Since SAR–3 and SAR–2 are open, SO–2 is not energized.

When contact 10 is closed, coil CR14 is energized which seals itself in through CR14–1 on the same bus. At the same time the circuit is made through SOP–HI–1, SAR–4 and energizes SO–2 to bring the second pump into operation. Under this condition SO–1 is the main pump and SO–2 the standby. Both are then in operation and pump the necessary quantity of seal oil up to the elevated tank. When oil pressure reaches a normal value SOP–HI–1 opens, shutting off SO–2. If there is a later drop in oil pressure SO–2 will come back into operation.

On the next startup the SAR–1, 2, 3 and 4 contacts will be in a reversed position due to operation of the SAR switch. SAR–2, 3 and SOP–HI–1 will be closed and SAR–1 and 4 will be open. The reverse operation takes place. Closure of contact 9 energizes coil CR13 which seals itself in through CR13–1 on the time delay shut down bus. At the same time a circuit is made through SAR–2 to pump SO–2 which under these conditions is the main pump. On the next step when contact 10 closes, CR14 is energized sealing itself in through CR14–1 to the time delay shut down bus. A circuit is also made through SOP–HI–1 through SAR–3 to pump motor SO–1 to start the other seal oil pump which under these conditions is the secondary or standby pump. When the pressure reaches a predetermined value SO–1 cuts out because SOP–HI–1 opens and it maintains its standby status to cut in again if the pressure falls below a predetermined value. This alternate standby pump arrangement could be utilized in any one of the previous circuits such as those associated with contacts 6, 7, or 8 for equalizing motor wear when multiple pumps are used.

*Step 11.*—Step 11 initiates the purging and partial pressurizing of the compressor. Closure of contact 11 energizes coil CR15 which seals itself in through contact CR15–1. SOL–HI–1 closes in response to the level in the oil tank leading to the seal. SOL–HI–1 could close before contact 11 closes because it is operated in response to SO–1 and SO–2. This will depend upon how fast SO–1 and SO–2 bring up the level in the seal oil tank. Simultaneously TD5 is energized. The compressor pressurizing valve opens (CO–PRV in FIGURE 1) and the compressor vent valve, CO–VV, stays open until TD5 closes TD5–1. As soon as CO–VV closes, the purging part of the cycle is completed. Purging is necessary to ensure that an explosive mixture of gas and air is not present in the compressor, since compression up to 1000 p.s.i. will create enough heat to induce an explosion of any air-gas mixture that might be present.

The compressor pressurizing valve stays open and pressurizing continues to the predetermined pressure value established by switch PR–CO–1. When this closes it energizes coil CR16 which opens CR16–2 which closes CO–PRV. PR–CO–1 may or may not close before step 12 occurs but in any event the engine will not start until PR–CO–1 closes.

There is a purging cycle, an initial pressurizing and final pressurizing cycle which will be explained later. By purging all air is eliminated from the casing of the compressor. The heavier the charge in the compressor, the greater the starting torque. Therefore, the initial pressurizing is utilized to make sure that there is no air in the compressor, but not to put too much gas in to hinder starting.

CR21-1 and CR28-1 may be disregarded for the present.

*Step 12.*—Closing of contact 12 energizes coil CR17 which seals itself in through CR17-1. Coil CR17 is really a watchdog circuit for the entire system. Energization of CR17 opens CR17-2 and CR17-3 in the CR3 and CR4 circuits and closes CR17-5 in the middle of the unit annunciator (FIGURE 2) and also CR17-6 in the CR18 circuit. CR17-4 in the TD2 auxiliary shut down circuit is closed, but TD2 stays de-energized because CR4-2 is now open at this point, as it opened when CR4 was energized. The opening of contacts CR17-2 and CR17-3 brings in the monitoring and shut down circuits in the CR3 and CR4 circuits so that at any later time if any malfunction is detected in these circuits, a shut down results.

*Step 13.*—Closing of contact 13 energizes coil CR18 which seals itself in through CR18-1. CR16-3 has been previously closed by energization of CR16 and CR17-6 has closed with energization of CR17, Step 12. The circuit is thereby closed through CR16-3 and CR17-6 to EC-8 which is the Master Supply Solenoid valve for the pneumatic control system; to EC-7 which is the Diverting Solenoid in the control air supply circuit; and through normally closed CR20-3 to EC-21 which is the starting air supply valve. The circuit is also completed if the switch is in the automatic position through normally closed contacts CR24-2 which energizes EC-14 which is a starting cycle control solenoid. The opening of EC-8, EC-14 and EC-21 permits starting air to go into the engine.

When the starting air brings the engine speed to a preselected speed such as 50 r.p.m., contact EC25-1 is closed which energizes the coil CR19 which closes contact CR19-1. EC-25 is a speed transducer output Pressure Switch which measures r.p.m. in terms of pressure. This same function can be accomplished electrically. The closing of CR19-1 energizes TD6 through CR20-2, and also energizes EC-23 the fuel gas supply valve, and EC-32, the changeover solenoid through CR24-3. Ignition relay IGR is also energized. Thus the ignition and the gas supply are turned on after the engine has come up to 50 r.p.m., or any other predetermined speed which may be taken from an appropriate setting on EC-25.

The engine must attain a preselected speed such as 350 r.p.m. which again may be taken from an appropriate setting on EC-25 in a predetermined time or timer TD6 will count out. This results in a time delay shut down through contact TD6-1 in the CR4 circuit at the left-hand portion of the diagram. The engine has begun to fire at the 50 r.p.m. speed with the gas and ignition on.

As soon as the engine speed comes to 350 r.p.m., CR20 is energized through EC25-2 and locked in through normally closed TD7-1 and CR20-1. TD7 is energized and begins to count out. This permits the engine speed to vary back and forth about 350 r.p.m. for a preset and adjustable length of time, that length of time being determined by the time setting of TD7. Thus, should unstable speed result at startup, the unstable condition will be allowed to continue for the length of the time setting of TD7. When TD7 times out, it opens its contact TD7-1 and TD7-2. Thereafter if the engine speed falls below 350 r.p.m., CR20 is de-energized because the only connection between the instantaneous bus and L-2 through CR-20 is through EC-25-2 which opens at speeds below 350 r.p.m. If CR20 is de-energized, contact CR20-4 in the CR4 circuit opens which results in a time delay type of shut down. This constitutes flame out protection.

*Compressor final pressurizing*

Assume that the engine is running over 350 r.p.m. with a partial pressurizing of the compressor. The cycle has passed through the TD7 circuit and is starting the compressor final pressurizing cycle.

Energization of CR20 closes contact CR20-5 which energizes TD8 and allows TD8 to count out for approximately five minutes, this time being adjustable. TD8 controls the warmup cycle and permits the engine to run without any further loading.

When TD8 counts out it closes contact TD8-1 which energizes coil CR23 which energizes CR21 through its contact CR23-2 and normally closed CR22-2.

When CR21 is energized it closes contact CR21-1 in the CR16 circuit and opens the compressor pressurizing valve CO-PRV for the second time. The circuit is completed through the bus, CR15-1, SOL-HI-1, CR21-1 to CO-PRV. When the compressor pressure is equal to the line pressure, pressure switch USV-Delta P-1 closes, energizing CR22 which opens normally closed CR22-2 de-energizing CR21, opening CR21-1 and de-energizing compressor pressurizing valve CO-PRV.

Energization of CR20 locks out the starting air supply valve EC-21 by opening normally closed CR20-3.

When CR22 is energized its contact CR22-3 is closed and a circuit is made through normally closed limit switch LS-UDVO-1 which operates the motor starter coil on the unit discharge valve UDV in FIGURE 1, and starts to open the valve. When the unit discharge valve is fully opened it opens its limit switch LS-UDVO-1 to stop the motor and at the same time closes limit switch LS-UDVO-2 which energizes CR24 which closes CR24-1 which completes a circuit through LS-USVO-1 and energizes the starter of the unit suction valve USV shown in FIGURE 1. The unit suction valve begins to open at the same time normally closed CR24-2 in the CR18 circuit opens causing the unit to switch over to pipeline control by de-energizing EC-14. When the valve is fully opened it opens limit switch LS-USVO-1 shutting off the valve motor and closes limit switch LS-USVO-2 which energizes coil CR25. Now the unit is in full operation.

When CR25 is energized it opens contact CR25-1 in the CR6 circuit which de-energizes master timer TD3 and also de-energizes CR6 which signifies a complete successful start, and allows the reset counter to go back to zero by opening CR6-2.

Energization of CR24 also opens contact CR24-3 which de-energizes changeover solenoid EC-32.

*Station and unit shutdown system*

In any shut down operation, the instantaneous bus is de-energized which results in an immediate shut down of the engine. When normally closed CR5-1 is open, the ignition relay IGR and the main fuel gas supply valve EC-23 are de-energized. This time delay which allows selected auxiliaries to run after engine shut down to cool the unit down is adjustable on TD2. This time delay shut down reduces the danger of leakage and failure of joints which may result from high thermal stresses created by the failure to dissipate the heat locked into the engine.

In an emergency shut down both busses will shut down at the same time. Any shut down in the CR4 circuit initiated by its protective switch will cause its contact to open de-energizing CR4 which closes CR4-2 which energized TD2 because CR3-3 and CR17-4 have already been closed. CR5 is thus energized which opens CR5-1 de-energizing the instantaneous shut down bus.

During normal running, CR26 is energized. In the event of shut down the instantaneous bus is de-energized which in turn de-energizes CR26 and closes its contact CR26-1. This contact has been open during normal operation. This energizes the motor operator on the unit discharge valve UDV through closed contact LS-UDVC-1, which closes the unit discharge valve. When the unit discharge valve is fully closed, limit switch LS-UDVC-1 opens shutting off the valve operating motor. At the same time limit switch LS-UDVC-2 closes energizing CR27. Energization of CR27 closes CR27-1 which energizes the motor operator for the unit suction valve USV. When the unit suction valve is fully closed, limit switch LS-USVC-1 opens and at the same time LS-USVC-2 closes to thereby energize CR28 thus making a restart possible. Their contacts CR27-2 and CR28-2 in the CR2 circuit are therefore closed. If all other conditions are proper a restart of the unit can now be made, but not until both unit valves are closed.

Engine control schematic

A schematic diagram of the engine control circuit is shown in FIGURE 4. It will be understood that the circuits illustrated in FIGURES 2, 3 and 4 are an integral part of the system shown in FIGURE 1 and the valves and relays are so tied together that in many instances an operation must be performed in one circuit before a succeeding one can be performed in another. In the main however, the engine control circuit illustrated in FIGURE 4 does not come into operation until the latter part of the circuit of FIGURE 3. In the following description reference should also be had to that latter portion of FIGURE 3. In FIGURE 4 the pneumatic valves in the engine control circuit are not circled so as to differentiate them from the condition responsive switches of FIGURE 2 and 3. The title of each valve is listed in the following legend under the portion headed "Engine Control Symbols."

In FIGURE 4 two completely independent though interrelated air lines are indicated. The starting air supply, SAS, may be under pressure of 250 to 350 p.s.i. and is indicated by a dashed line. This air causes the engine to crank prior to admission of fuel and for a short while after. A control air supply, CAS, which may be on the order of 25 to 30 p.s.i. is indicated by a solid line. The dotted portion of it represents the path the air follows when the automatic start circuit is energized. The control air supplies operating pressure to regulating valves which are set at predetermined values.

With the closing of sequential step 13, described in connection with FIGURE 3, EC–21 is energized which makes starting air available to the engine, but does not in itself admit starting air to the engine, since EC–22 still blocks starting air to the engine.

When contact CR16–3 closes, control air supply solenoid valves EC8 and either EC14 or EC7 are energized simultaneously depending on what mode of operation is selected on the manual-automatic switch of FIGURE 3. EC8 is the master supply solenoid and it supplies control air to the entire engine control system. Any shut down, whether planned or emergency, automatic or manual, will cause the de-energization of EC8. When EC8 is de-energized, the pneumatic engine controls are vented down and the engine shuts down. All engine controls are "fail safe" so that their failure to operate will protect the engine rather than allow it to run without control.

Automatic operation

Assume that fully automatic engine operation is chosen by the positioning of the engine control manual-automatic switch. This energizes EC14, which is the starting cycle control solenoid, through the control air supply regulaotr EC10 which maintains the CAS at a preselected value, the barring gear interlock EC–9, the energized master supply solenoid EC–8, and the de-energized diverting solenoid EC–7.

Energization of EC14 simultaneously supplies proper pneumatic starting signals to EC24, the pilot operated gas regulating valve, through gas control diverting solenoid EC28, gas pressure rate control valve EC26, and gas control station EC–4; to EC2, the linkshaft, through linkshaft control selector EC29 and linkshaft control station EC5; and to EC1, the rack positioner, through starting cycle supply regulator EC16, selector relay EC–30, and speed control station EC–6. For this manual-automatic control, stations EC4, 5, 6 are all in the automatic position. At the same time a signal is fed to the operator of EC18, the starting air pilot admission valve through manual start interlock EC11 which then opens and allows high pressure air to operate on the pilot operated starting air supply valve EC22. This then supplies starting air to the engine causes it to crank. As the engine starts, the pneumatic speed transmitter EC3 puts out an air pressure proportional to speed. When 50 r.p.m. is sensed by the speed transducer output pressure switch EC25, the engine ignition relay IGR and the fuel gas supply valve EC23 are energized through the energization of CR19 as shown in FIGURE 3. This then allows the engine to fire. As the engine continues to accelerate, at a predetermined output pressure of the speed transducer (corresponding to speed), the starting air pilot shutoff valve EC19 is closed which in turn shuts off starting air to the engine through the pilot operated starting air supply valve EC22.

The engine continues to accelerate and at 350 r.p.m., or whichever speed is chosen, the second contact of speed transducer pressure switch EC25–2 closes which in turn energizes CR20 and TD–7. As previously explained, this causes the de-energizing of the starting air supply valve EC21 making it impossible to readmit starting air to the engine, even though speed should fall off, until another complete start is initiated.

The engine then continues to accelerate until it reaches the preset warmup speed as determined by starting cycle supply regulator EC16 which may be 350–400 r.p.m. for example. During warmup, engine gas pressure is determined by EC39, the warmup gas pressure control regulator, and linkshaft position by EC38, the warmup linkshaft control regulator, through gas control diverting valve EC28 and linkshaft control selector EC29 respectively. It should be noted here that the linkshaft is held in full retard position until the energization of CR20 as controlled by the closing of EC25–2 which energizes EC37, the starting linkshaft retard solenoid. This insures starting in full retard position in order to achieve optimum starting. With the energization of CR20 signifying the engine has started, the linkshaft is advanced slowly, the rate of advance being controlled by linkshaft rate control valve EC27, to the optimum position for warmup. For further details concerning the operation of the linkshaft during start and run, see Patent Numbers 2,670,595, issued March 2, 1954, for "High-Pressure Supercharging System" and 2,773,490, issued December 11, 1956, for "High Expansion, Spark Ignited, Gas Burning, Combustion Engines."

When the warmup period is completed, as determined by the unit discharge valve being fully open and the unit suction valve beginning to open, CR24 energizes and opens its contact CR24–2 which de-energizes EC14, shutting off the supply to the engine warmup system and causing the warmup system to vent down.

Bumpless switchover

When the warmup signal entering selector relay EC30 decays, it causes station controller isolating valve EC31 to open when acted upon by pressure passed through starting cycle interlock valve EC15 which opens when its pilot pressure is vented due to the de-energization of EC14. Changeover solenoid EC32 has previously closed by energization through closing of CR19–1. Thus control air pressure builds up slowly from the station pipeline controller through restricting or station controller rate control valve EC33 to EC30. When this input to EC30 becomes just slightly greater than the decaying warmup input signal, the selector relay EC30 chooses the higher signal from the station pipeline controller. EC32 later opens upon energization of CR–24 and opening of CR24–2. The unit now is under direct control from the pipeline controller. This switchover from warmup to pipeline control comprises the "bumpless switchover" and becomes desirable when more than one unit is to be run from one master control.

The speed of switchover is adjustable by the adjustment of one direction restrictions EC17 switchover rate control and EC33. These restrictions offer no resistance to flow in the direction opposite to flow restrictions. (This same feature applies to EC26, gas pressure rate control EC27, and speed transmitter rate control EC20.) De-energization of EC14 causes the pilot pressure on EC28 and EC29 to vent which then causes these valves to pass new pilot signals to the pilot operated gas regulating valve EC24 and the linkshaft EC2 respectively from gas control run pressure regulator EC35 and bias controller EC36. The rate of change to new fuel gas pressure and linkshaft position is regulated by EC26 and EC27. The engine then is under pipeline control and can assume loading as dictated by pipeline requirements.

*Manual operation*

Manual engine operation is accomplished by placing the manual-automatic engine control switch in the manual position. This in turn energizes EC7 along with EC8 and EC21, after step 13 and the closure of CR16–3. Energization of the diverting solenoid EC7 supplies control air to manual starting air control EC12 and to manual-automatic stations EC4, 5, 6 which must be in the manual position. These control the fuel gas pressure, linkshaft position, and unit speed respectively. With this manual starting option an operator will do much the same thing that the automatic start accomplished; however, he sets each of these parameters directly. EC11 closes to block off the automatic portion on manual operation. This is desirable in order that in the event of automatic controls component failure the unit can be operated and thus not loose the service of the unit. Further, after overhaul of the unit, the service man may want to run the unit manually in order to observe performance. Thus full flexibility is provided in this design. The operator will start the engine and bring it up to speed and load using EC12, 4, 5 and 6.

FIGURE 5 shows diagrammatically the sequence of operations for automatic pipeline station operation as controlled by the system herein described. The flexibility designed into the system allows for changes in timing as well as sequence, should such become necessary for an individual case. The diagram covers a single unit in a single unit station with normal station operation. Shutdown, which is other than normal, would a'ter the right-hand portion of the diagram in accordance with the explanation given in this application.

The foregoing description is illustrative only and not definitive. Accordingly, the invention shou'd not be limited except by the scope of the following appended claims.

STATION AND UNIT CONTROL SYMBOLS

PM—prime mover
EN—engine
SI—speed increaser
CO—compressor
P—pressure
T—temperature
L—level
O—open
C—closed
LO—low
HI—high
VI—vibration
M—manual
A—automatic
CR—control relay contact
TD—time delay relay contact
SAR—sequence alternating relay
STR—sequence timing relay (step switch)
LS—limit switch
RC—reset counter
IGR—ignition relay
SP—suction pressure
DP—discharge pressure
PLF—pipeline flow
FD—fire detection
EA—explosive atmosphere
CA—control air
SVV—station vent valve
SBPV—station bypass valve
SSV—station suction valve
SDV—station discharge valve
SA—starting air
MLO—main lubricating oil
ALO—accessory lubricating oil
JW—coolant
F—fuel
B—bearing
GD—gas discharge
SO—seal oil
OS—overspeed
AF—air filter
CCV—crankcase vacuum
SFV—station fuel valve
PRV—pressurizing valve
UDV—unit discharge valve
USV—unit suction valve
UBVC—unit bypass check valve
B & A—before and after
ΔP—differential pressure ① Opens on Falling Pressure
② Opens on Rising Pressure
③ Opens on Rising Temperature
④ Opens on Falling Temperature
⑤ Opens on Falling Level
⑥ Opens on Excessive Flow
⑧ Opens on Excessive Vibration
⑨ Opens on Explosive Atmosphere
⑩ Opens on Excessive Surge
CR Control Relay Switch
TD Time Delay Switch
= Normally Open Contact
≠ Normally Closed Contact
Motor Starter
Manual-Automatic Two-Way Switch
Pressure Operated Switch
Temperature Operated Switch
Level Operated Switch
Flow Sensitive Switch
Vibration Sensitive Switch
Circuit Breaker Ⓐ Reset Timer Ⓑ Reset Counter Ⓒ Step Switch Ⓓ Sequence Alternating Relay Ⓔ Repeat Cycle Timer NOTE.—All switches and relay contacts are shown in de-energized state.

ENGINE CONTROL SYMBOLS

EC1—rack positioner
EC2—linkshaft positioner
EC3—pneumatic speed transducer
EC4—manual-automatic—gas control station
EC5—manual-automatic—linkshaft control station
EC6—manual-automatic—speed control station
EC7—diverting solenoid
EC8—master supply solenoid
EC9—barring gear interlock
EC10—control supply regulator
EC11—manual start interlock
EC12—manual starting air control
EC13—manual starting air pilot admission valve
EC14—starting cycle control solenoid
EC15—starting cycle interlock valve
EC16—starting cycle supply regulator
EC17—switchover rate control
EC18—starting air pilot admission valve
EC19—starting air pilot shutoff valve
EC20—speed transmitter rate control
EC21—starting air supply valve
EC22—pilot operated starting air supply valve
EC23—fuel gas supply valve
EC24—pilot operated gas regulating valve
EC25—speed transducer output pressure switch (dual)
EC26—gas pressure rate control
EC27—linkshaft rate control
EC28—gas control diverting valve
EC29—linkshaft control selector
EC30—selector relay
EC31—station controller isolating valve
EC32—changeover solenoid
EC33—station controller rate control
EC35—gas control run pressure regulator
EC36—bias controller
EC37—starting linkshaft retard solenoid
EC38—warmup linkshaft control regulator
EC39—warmup gas pressure control regulator

We claim:

1. A system for controlling the start up, operation and shut down of a prime mover system including a source of motive power such as an internal combustion engine at a remotely located station, said system including, in combination, means for sensing selected station conditions, means for indicating the normality or abnormality of the selected station conditions, means for admitting power to an individual unit in the station in response to an indication of normality by the selected station condition indicating means, said unit including an internal combustion engine and its associated auxiliaries, means for sensing a plurality of selected unit conditions, means for indicating the normality or abnormality of the selected unit conditions, start up means responsive to an indication of normality by the selected condition unit indicating means for starting up the unit, means for controlling operation of the unit, and means for shutting down the unit.

2. The system of claim 1 further characterized in that the start up means includes means for starting selected unit auxiliaries, means for holding off operation of the source of motive power until after the completion of the unit auxiliaries start up, and means for initiating operation of the source of motive power in response to a successful start of the unit auxiliaries.

3. The system of claim 2 further characterized in that the means for starting the unit auxiliaries includes a sequential starting system.

4. The system of claim 2 further characterized by and including means for bringing a second unit into operation at a multi-unit station without affecting the speed of operation of the unit or units already in operation.

5. The system of claim 2 further characterized in that the means for shutting down the unit includes instant and sequential shut down means.

6. A starting, operating and shutdown system for a remotely located prime mover unit, said prime mover unit comprising essentially a prime mover and a plurality of associated auxiliaries, said system including, in combination,
means for indicating normal starting conditions for the price mover,
means for indicating normal starting conditions for the auxiliaries,
pre-start and run monitoring means for the prime mover unit,
said prime mover unit pre-start and run monitoring means, in response only to an indication of normality on the normal starting condition indicating means for the prime mover and auxiliaries, being operable to permit start-up and run of the prime mover and the auxiliaries, and to shut down the prime mover unit in response to abnormal conditions,
secondary starting means responsive to an indication of normality on the prime mover unit, pre-start and run monitoring means for bringing the auxilaries into operation,
prime mover start and run means responsive to normal operation of the secondary starting means for initiating operation of the prime mover,
and shutdown means for stopping the prime mover and auxiliaries.

7. The system of claim 6 further including prime mover monitoring means operable to monitor run conditions of the prime mover and to shut down at least the prime mover in response to an indication of abnormality.

8. The system of claim 6 further characterized in that the secondary starting means includes sequential starting means for bringing the auxiliaries into operation in a predetermined, sequential manner so as to avoid control power surges.

9. The system of claim 8 further characterized by and including means for equalizing wear on selected, similar, auxiliaries on alternate startups.

10. The system of claim 6 wherein the shut down means includes a timing device operable to initiate shut down of the auxiliaries and prime mover if the prime mover does not attain a preselected speed in a predetermined time during start-up.

11. The system of claim 10 wherein the timing device is further operable to shut down the auxiliaries and prime mover should the prime mover fall below the preselected speed after once attaining it, said timing device further including hold-off means for preventing operation of the timing device to shut down the prime mover and auxiliaries for a predetermined period of time after attainment of the preselected speed.

12. The system of claim 6 wherein the prime mover start and run means includes a fluid pressure warmup control system having a plurality of indicating controls in which failure of any of the controls will shut the prime mover down rather than to allow it to run without control.

13. The system of claim 12 in which the prime mover fluid pressure warmup control system includes means for regulating the pressure of the fuel supply to the prime mover, and means for regulating the amount of fuel admitted to the prime mover in response to the load on the prime mover.

14. The system of claim 12 in which the prime mover fluid pressure warmup control system further includes means for admitting high pressure fluid to crank the prime mover during start up.

15. The system of claim 14 further including speed sensing means operable to actuate ignition means and to admit fuel to the engine in response to a first predetermined speed indicated by the sensing means.

16. The system of claim 15 further including means for cutting out the high pressure cranking fluid in response to a second predetermined speed.

17. The system of claim 13 in which the load-fuel regulating means includes a pressure selector device operable to regulate the amount of fuel to the prime mover in response to a pressure signal from a load measuring device in a work receiving system when the pressure signal exceeds the pressure in the fluid pressure warmup control system.

18. The system of claim 17 further including adjustment means for adjusting the rate of changeover from the fluid pressure warmup control system to the control imposed by load requirements.

19. The system of claim 14 further including manual means selectively operable to admit cranking air to the prime mover and to regulate the fuel pressure, linkshaft position and speed control of the prime mover.

20. A starting, operating and shut down system for a prime mover station having one or a plurality of prime mover units such as internal combustion engines with associated auxiliaries, said system including, in combination, a source of control power for the system, means for monitoring and indicating preselected start and run conditions at the station; first interrupting means operable to interrupt the control power to the system in response to a condition of abnormality in the station start and run conditions as indicated by the station monitoring and indicating means; means for admitting the control power to a prime mover unit in response to a condition of normality of the station start and run conditions as indicated by the station monitoring and indicating means; means for monitoring and indicating preselected start and run conditions at the unit, said last named means including second power interrupting means operable to interrupt power to the unit in response to a condition of abnormality of the unit start and run conditions as indicated by the unit monitoring and indicating start and run condition means; auxiliary starting means responsive to an indication of normality in the unit start and run monitoring and indicating means for bringing at least preselected auxiliaries into operation prior to actuation of a warm-up control system for the prime mover, and prime mover start and run means responsive to normal operation of the preselected auxiliaries, for bringing the prime mover into operation.

21. The starting, operating and shut down system of claim 20 further including unit run monitoring means operable to monitor the balance of the start and run conditions not monitored by the monitoring and indicating preselected start and run condition means.

22. The starting and operating system of claim 20 further characterized by and including means for cutting in the balance of the auxiliaries after actuation of the primer mover warmup system.

23. The starting and operating system of claim 20 further characterized in that the auxiliary starting means includes a timed sequential starting device for bringing the auxiliaries into operation in a predetermined, sequential manner to thereby avoid power surges in the system control power.

24. The starting and operating system of claim 20 further characterized in that the prime mover includes an engine warmup control system for bringing the prime mover up to a predetermined operating speed prior to putting the unit into a work receiving system.

25. The starting and operating system of claim 24 further characterized by and including a speed responsive device for shutting down the unit if the prime mover fails to obtain a preselected speed in a predetermined period of time.

26. The starting and operating system of claim 25 further characterized by and including counting means operable to permit a predetermined number of unit starts and then to lock out the unit upon completion of the predetermined number of unsuccessful starts.

27. The starting and operating system of claim 25 further characterized by and including means for holding off the initial shut down actuated by the speed responsive device for a predetermined period of warmup time.

28. The starting and operating system of claim 24 wherein the fluid pressure warmup control system comprises a plurality of function controls so biased that failure of one or more individual controls will shut the unit down.

29. A control system for an internal combustion engine including a supply of control fluid, a plurality of variable engine controls operable in response to control fluid pressure, first pressure signal generating means associated with the control fluid supply operable to generate a pressure signal proportionate to the control fluid pressure, means for generating a second pressure signal proportional to engine load, and means for selecting and transmitting the higher of the two signals to the engine controls.

30. A control system for an internal combustion engine including a supply of control fluid, a plurality of variable engine controls, a source of starting air for the engine, means operable in response to a first pressure signal from the pressure signal generating means to admit control fluid to the variable engine controls and to admit starting air to the engine, means for generating a second pressure signal proportional to engine load, and means for selecting and transmitting the higher of the two signals to the engine controls.

31. The engine control system of claim 29 further including means for shutting off the supply of control fluid.

32. The engine control system of claim 30 further including means for shutting off the supply of control fluid.

33. A manual start-up and run fluid control system for an internal combustion engine, said system including, in combination, a source of starting fluid for the engine,
a supply of control fluid,
a plurality of manually regulatable engine parameter controls connected to the control fluid,
a manually actuable pressure signal generator in the control fluid supply,
first means, operable in response to a pressure signal from the manually actuable pressure signal generator, for admitting starting fluid to the engine to cause it to crank,
and second means, operable in response to the attainment of a pre-selected engine condition, for shutting off starting fluid to the engine automatically upon attainment of said pre-selected engine condition, whereby run control of the engine may thereafter be accomplished by manipulation of the manually regulatable engine parameter controls.

34. The manual start-up and run fluid control system of claim 33 further characterized in that the second means is responsive to a predetermined engine speed for shutting off starting fluid.

35. The manual start-up and run fluid control system of claim 33 further characterized in that the second means is responsive to a second fluid pressure signal proportional to engine speed generated by a second pressure signal generator which is responsive to engine speed.

36. The manual start-up and run fluid control system of claim 33 further including third means for locking out starting fluid after shut-off until a new start-up is initiated.

37. An automatic start-up and warm-up fluid control system for an internal combustion engine, said system including, in combination, a source of starting fluid for the engine,
a supply of control fluid,
a plurality of automatically regulatable engine parameter controls connected to the control fluid,
an automatically actuable pressure signal generator in the control fluid supply,
first means, operable in response to a pressure signal from the automatically actuable pressure signal generator, for admitting starting fluid to the engine to cause it to crank,
second means, operable in response to the attainment of a pre-selected engine condition, for shutting off starting fluid to the engine,
and a plurality of regulators, one for each of the automatically regulatable engine parameter controls, each regulator being operable, in response to attained conditions during warm-up, to regulate its associated engine parameter control and thereby control the engine until run conditions are achieved.

38. The automatic start-up and warm-up fluid control system of claim 37 further including third means for locking out starting fluid after shut-off until a new start is initiated.

39. An automatic start-up, warm-up, and run fluid control system for an internal combustion engine, said system including, in combination, the automatic start-up and warm-up system of claim 37,
means for cutting out the automatically actuable pressure signal generator, the first means, the second means, and the regulators,
and fourth means for bringing the automatically regulatable engine parameter controls under direct control of the control fluid and load induced pressure signals.

40. A control system for an internal combustion engine having a pneumatically actuated fuel gas supply, linkshaft, and rack positioner, said control system including, in combination, first, second, and third control stations for the fuel gas supply, linkshaft, and rack positioner respectively,
a starting air line connected to a source of starting air and the engine for cranking the engine,
a control air line connected to the control stations,
and a plurality of control devices in the control air line for generating control pressure signals and transmitting the signals to the starting air line and control stations to thereby crank and start the engine.

41. The system of claim 40 wherein the control devices include a first master control air supply valve in the control air line, a starting air supply valve in the starting air line, said last named valve being responsive to the starting air pressure to admit starting air to the engine, a starting air pilot admission valve in the starting and control air lines, said last named valve being responsive to a pressure signal in the control air line to admit starting air to the starting air supply valve, said master control air supply valve being operable to selectively block control air to the system or to simultaneously admit control air pressure signals to the starting air pilot admission valve and control stations.

42. The system of claim 41 further including means for replacing the control air pressure signals with a load responsive signal.

43. The system of claim 42 in which the control air pressure signal replacing means includes means for transmitting an auxiliary pressure signal proportional to engine load to a pressure selector in the control air line between the master valve and the control stations, said pressure selector being operable to transmit the higher of the pressure signals received by it to the control stations, and control air cut-off means responsive to a predetermined condition such as engine speed to cut off the control air pressure signal to the pressure selector.

44. The system of claim 41 further including a second master control air supply valve adapted to simultaneously transmit control air pressure to the control stations, and to a manual starting air valve between the first master control air supply valve and the starting air pilot admission valve.

45. An engine control system for an internal combustion engine assembly, said assembly including a plurality of engine auxiliaries, an electrical system for bringing the auxiliaries into operation in a predetermined sequence, condition sensing means operable to shut down the auxiliary electrical system upon detection of abnormal conditions, a fuel admission regulator, an adjustable fuel ignition timing device, and a speed control device for varying the speed of the engine by varying the quantity of fuel admitted, said system including a source of starting air for cranking the engine, a source of control air, a master control air supply regulator operable from the electrical system to transmit a pressure signal to the fuel admission regulator, the ignition timing device, the speed control device, and to a starting air admission valve in the starting air supply line, means for sensing a first preselected speed of the engine, means for activating an ignition device in response to the attainment of a first engine speed, means for sensing a second speed of the engine, means responsive to the second speed to cutoff starting air to the engine, means for cutting off the master control air supply regulator in response to the termination of a predetermined period of warmup, and a pressure sensitive device in the control air supply line to the fuel admission regulator, ignition timing device, and speed control device for controlling the aforesaid elements in response to a pressure signal proportional to the load on the engine.

46. A pressure sensitive selective regulating device for operating variable parameters such as engine controls in an engine control system including a pressure sensitive device adapted to receive air pressure signals of varying intensity from an air pressure control system and a work receiving system, and means for transmitting the strongest signal to the variable parameter controls.

47. The device of claim 46 further including a pressure build up control in the work receiving system adapted to insure a gradual build up of the pressure transmitted to the selector device from the work receiving system upon decay of the pressure signal from the pressure control system to thereby eliminate any sudden shock when control of the variable parameters switches from the air pressure control system to the work receiving system.

48. The device of claim 47 further including a blocking valve between the pressure build up control and the work receiving system adapted to admit the pressure signal from the work receiving system to the pressure build up control simultaneously with decay of the pressure signal from the pressure control system.

49. A method of starting and running an internal combustion engine unit including the steps of measuring and indicating selected prestart conditions, progressively starting a plurality of engine auxiliaries in response to an indication of normality of the prestart conditions, activating an engine control system upon successful start of the auxiliaries, admitting cranking air to the engine, furnishing fuel and ignition means to the engine at a first pre-selected speed, de-activating the engine control system at a second pre-selected speed, and regulating variable engine control parameters by load demands upon de-activation of the engine control system.

50. A method of starting and running an internal combustion engine unit including the steps of monitoring selected prestart conditions, sequentially starting a plurality of engine auxiliaries in response to an indication of normality of the prestart conditions, activating an engine control pressure system upon successful start of the auxiliaries, furnishing cranking air to the unit, admitting cranking air to the engine upon successful start of the auxiliaries under control of the engine control system, feeding a pressure signal to the engine control system proportional to engine speed, activating engine combustion means upon receipt of said pressure signal at a predetermined intensity, blocking off cranking air to the engine, passing a second pressure signal proportional to load requirements into the engine control pressure system, de-activating the engine control pressure system upon receipt of said second pressure signal when said second signal is larger than said first signal; and operating variable engine control parameters including the combustion means by the second pressure signal when said second pressure signal becomes greater than the decaying engine speed pressure signal.

51. A method of starting an internal combustion engine unit at a remotely located station including the steps of monitoring the station conditions, monitoring the unit conditions upon reception of an indication of normality in station conditions, sequentially starting a plurality of engine unit auxiliaries in response to an indication of normality of the unit conditions, monitoring additional conditions created by additional auxiliaries, activating an engine control pressure system upon successful start of the auxiliaries, admitting cranking air to the engine upon successful start of the auxiliaries under control of the engine control pressure system, feeding a pressure signal to the engine control system proportional to engine speed, activating engine combustion means upon receipt of a pressure signal of predetermined intensity, blocking off cranking air to the engine, passing a second pressure signal proportional to load requirements into the engine control pressure system, de-activating the engine control pressure system upon receipt of a pressure signal of higher intensity proportional to engine speed, and regulating variable engine control parameters including the combustion means by the second pressure signal when said second pressure signal becomes greater than the decaying engine speed pressure signal.

References Cited in the file of this patent

UNITED STATES PATENTS

| | | |
|---|---|---|
| 2,444,273 | Stevens | June 29, 1948 |
| 2,640,312 | Miller | June 2, 1953 |
| 2,711,696 | Rowell | June 28, 1955 |
| 2,714,883 | Metzger | Aug. 9, 1955 |
| 2,869,466 | Osterhout et al. | Jan. 20, 1959 |
| 2,931,166 | King | Apr. 5, 1960 |